US006428036B1

(12) United States Patent
Mramor et al.

(10) Patent No.: US 6,428,036 B1
(45) Date of Patent: Aug. 6, 2002

(54) AIR BAG SYSTEM WITH QUICK DISCONNECT COUPLING

(75) Inventors: Vincent J. Mramor, Chandler; Timothy A. Swann, Mesa; Kevin M. Brown, Mesa; Bryan W. Shirk, Mesa; Eric C. Erike, Mesa; Wesley D. Pack, Jr., Gilbert; Roy D. Van Wynsberghe, Mesa; Kirk W. Christiansen, Tempe, all of AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/625,429

(22) Filed: Jul. 25, 2000

(51) Int. Cl.$^7$ .............................................. B60R 21/16
(52) U.S. Cl. .................................... 280/728.2; 280/731
(58) Field of Search ............................ 280/728.2, 731, 280/736, 741, 742; 285/275

(56) References Cited

U.S. PATENT DOCUMENTS

| | | |
|---|---|---|
| 3,351,362 A | 11/1967 | Hansen |
| 3,708,194 A * | 1/1973 | Amit ............................ 293/1 |
| 3,930,667 A | 1/1976 | Osuchowski et al. |
| 4,059,852 A | 11/1977 | Crane |
| 5,111,838 A | 5/1992 | Langston |
| 5,829,780 A * | 11/1998 | Tesauro et al. ............. 280/731 |
| RE36,351 E | 10/1999 | Yamamoto et al. |
| 6,129,374 A * | 10/2000 | Yamada et al. .......... 280/728.2 |
| 6,135,492 A * | 10/2000 | Zimmerbeutel et al. . 280/730.2 |
| 6,152,484 A * | 11/2000 | Fischer et al. ............. 280/736 |
| 6,217,062 B1 * | 4/2001 | Breyvogel et al. ....... 280/730.2 |

OTHER PUBLICATIONS

Research disclosure entitled "Housing for an Inflatable Side Curtain", Mar. 1999.

* cited by examiner

*Primary Examiner*—Eric Culbreth
*Assistant Examiner*—David R. Dunn
(74) *Attorney, Agent, or Firm*—Tarolli, Sundheim, Covell, Tummino & Szabo L.L.P.

(57) ABSTRACT

An apparatus (10) for helping to protect an occupant of a vehicle (12) comprises an inflatable protection device (32). The apparatus (10) also comprises an actuatable inflator (30) remote from the protection device (32) for providing inflation fluid under pressure for inflating the protection device. The apparatus (10) further comprises a conduit (48) connected in fluid communication between the inflator (30) and at least a portion of the protection device (32) for directing inflation fluid from the inflator to the protection device. The conduit (48) includes at least one quick disconnect coupling (50) through which inflation fluid flows from the inflator (30) upon actuation of the inflator.

9 Claims, 4 Drawing Sheets

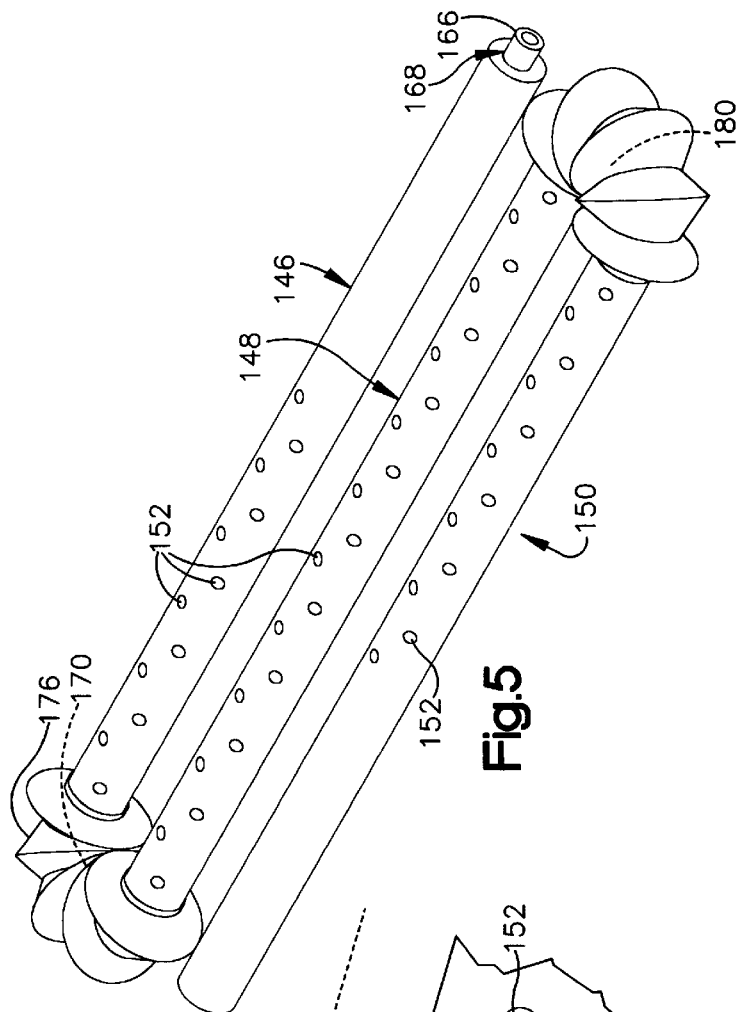
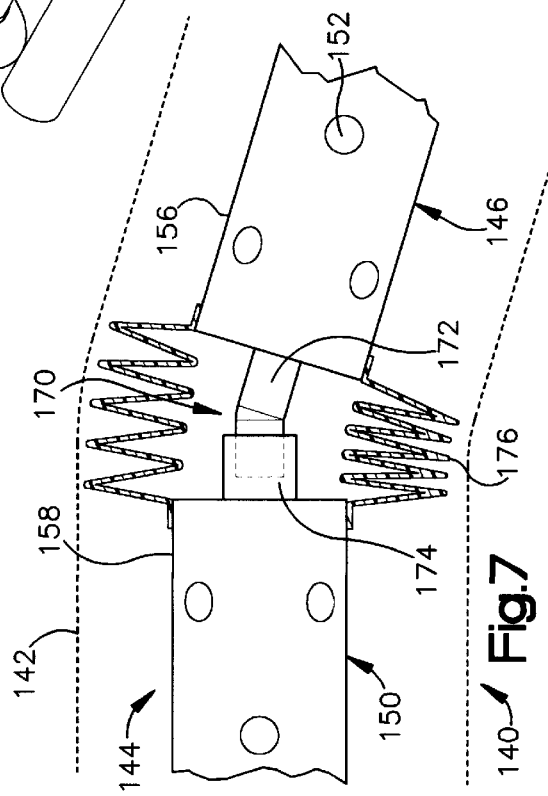
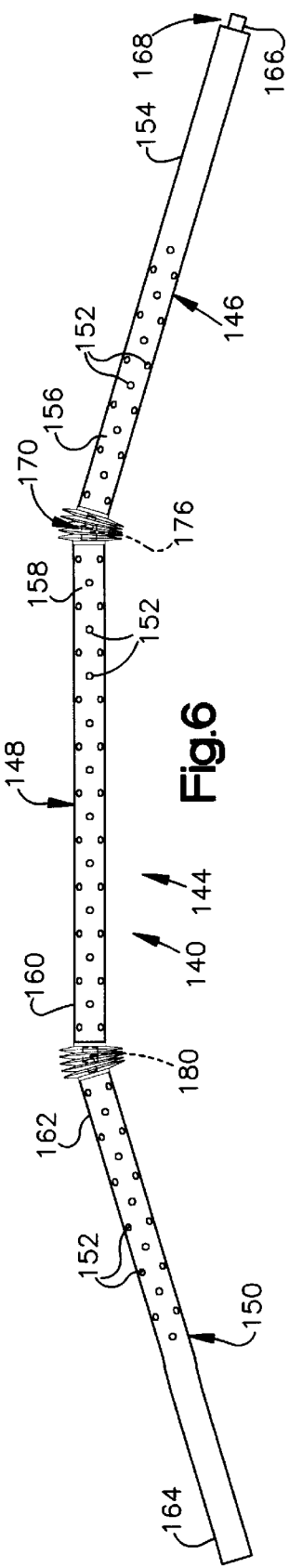

AIR BAG SYSTEM WITH QUICK DISCONNECT COUPLING

BACKGROUND OF THE INVENTION

1. Technical Field

The present invention relates to a vehicle occupant protection apparatus. In particular, the invention relates to an apparatus an including inflatable vehicle occupant protection device, such as an air bag, and a coupling for connecting the protection device with an inflator.

2. Description of the Prior Art

It is known to actuate an inflator to provide inflation fluid for inflating an occupant protection device, such as an air bag. The inflator and the protection device are typically provided as one unit for assembly in a vehicle. Often there is limited space available in a vehicle for mounting an air bag module. It is, therefore, desirable to provide as much flexibiity as possible in packaging of the module in the vehicle, for example, by making the component parts of a module smaller.

SUMMARY OF THE INVENTION

The present invention is an apparatus for helping to protect an occupant of a vehicle. The apparatus comprises an inflatable protection device. The protection device has a stored condition and is inflatable from the stored condition to a deployed condition for helping to protect the occupant. The apparatus also comprises an actuatable inflator remote from the protection device for providing inflation fluid under pressure for inflating the protection device. The apparatus further comprises a conduit connected in fluid communication between the inflator and at least a portion of the protection device for directing inflation fluid from the inflator to the protection device. The conduit includes at least one quick disconnect coupling through which inflation fluid flows from the inflator upon actuation of the inflator.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 5 is a view of a vehicle occupant protection apparatus in accordance with a third embodiment of the invention, including a fill tube for an inflatable side curtain of a vehicle, shown in a condition prior to assembly;

FIG. 6 is a view of the fill tube of FIG. 5 shown in an assembled condition; and FIG. 7 is an enlarged view of a portion of the fill tube of FIG. 6.

DETAILED DESCRIPTION OF EMBODIMENTS OF THE INVENTION

Figure 1:
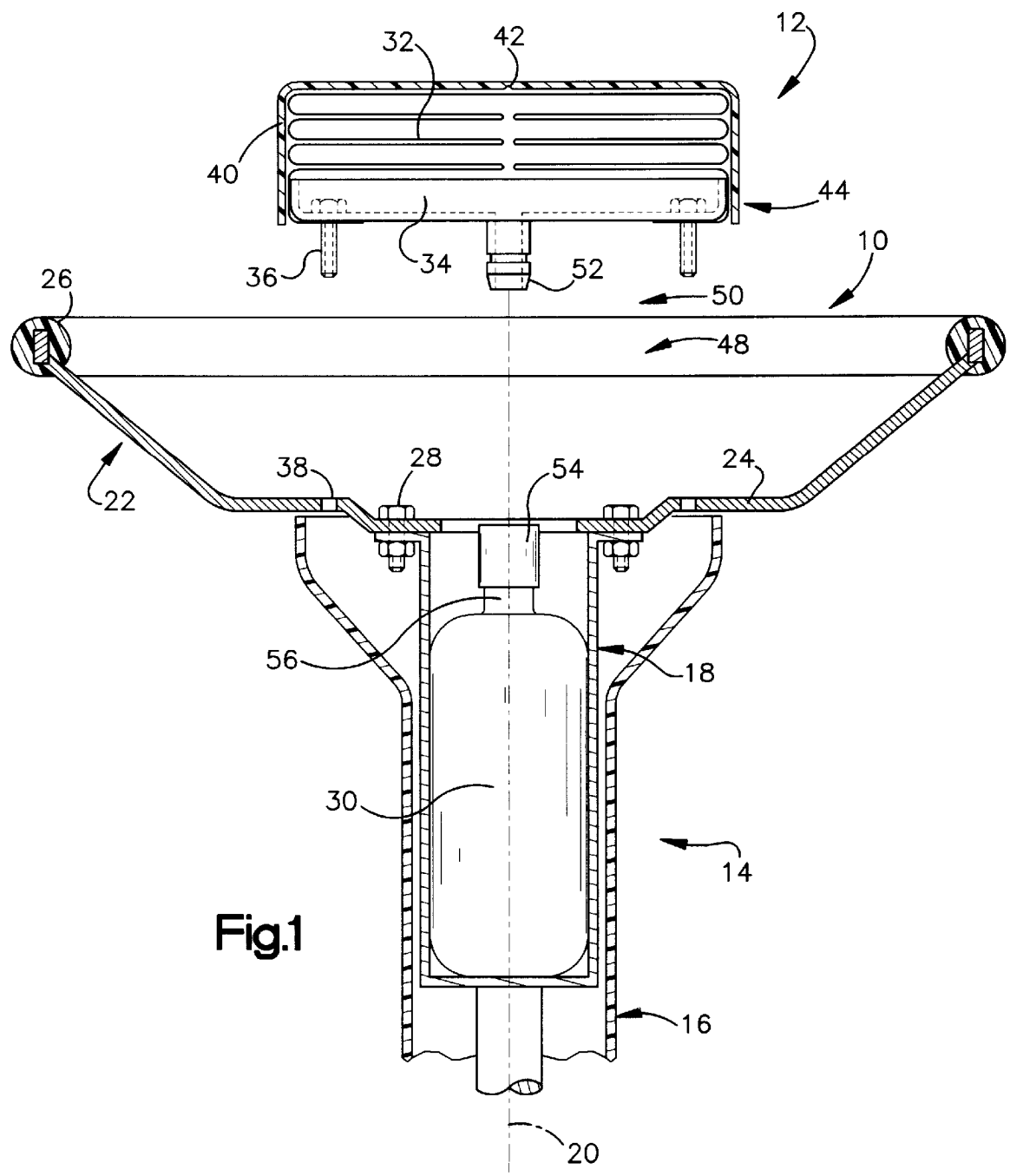
FIG. 1 is a sectional view of a vehicle occupant protection apparatus in accordance with a first embodiment of the invention, including an air bag ready for connection with an inflator.

The present invention relates to a vehicle occupant protection apparatus. In particular, this invention relates to an apparatus including an inflatable vehicle occupant protection device, an inflator, and a coupling for connecting the protection device with the inflator. The present invention is applicable to various occupant protection apparatuses. As representative of the invention, FIG. 1 illustrates a vehicle occupant protection apparatus 10 in accordance with a first embodiment of the invention.

The apparatus 10 is mounted in a vehicle 12 which includes a steering column 14. The steering column 14 has a fixed portion 16 and a movable portion 18. The movable portion 18 of the steering column 14 is disposed radially inward of the fixed portion 16 of the steering column. The movable portion 18 of the steering column 14 is supported on the fixed portion 16 of the steering column for rotation relative to the fixed portion about a steering axis 20.

The movable portion 18 of the steering column 14 supports a steering wheel 22. The steering wheel 22 has a hub portion 24 and a rim portion 26. The hub portion 24 of the steering wheel 22 is fixed by fasteners 28 to the movable portion 18 of the steering column 14. The steering wheel 22 is thus rotatable with the movable portion 18 of the steering column 14, relative to the fixed portion 16 of the steering column, about the steering axis 20.

The occupant protection apparatus 10 includes an inflator 30 supported in the rotatable portion 18 of the steering column 14. The inflator 30 preferably contains a stored quantity of pressurized inflation fluid in the form of gas to inflate an air bag. The inflator 30 alternatively could contain a combination of pressurized inflation fluid and ignitable material for heating the inflation fluid, or could be a pyrotechnic inflator that uses the combustion of gas-generating material to generate inflation fluid.

The occupant protection apparatus 10 includes an air bag 32, which is remote from the inflator 30, that is, is not provided as one unit with the inflator for assembly in the vehicle. The air bag 32 is mounted to a rigid retaining ring 34 having a plurality of fasteners 36. The fasteners 36 are extensible through fastener openings 38 in the hub portion 24 of the steering wheel 22. The air bag 32 is stored in a folded, deflated condition inside a cover 40. The cover 40 has a predetermined weakened portion, or rupturable portion, 42. The cover 40, retaining ring 34, and air bag 32 form an air bag assembly 44, which, as shown in FIG. 1, is movable relative to the inflator 30 when not attached to the hub portion 24 of the steering wheel 22.

Figure 2:
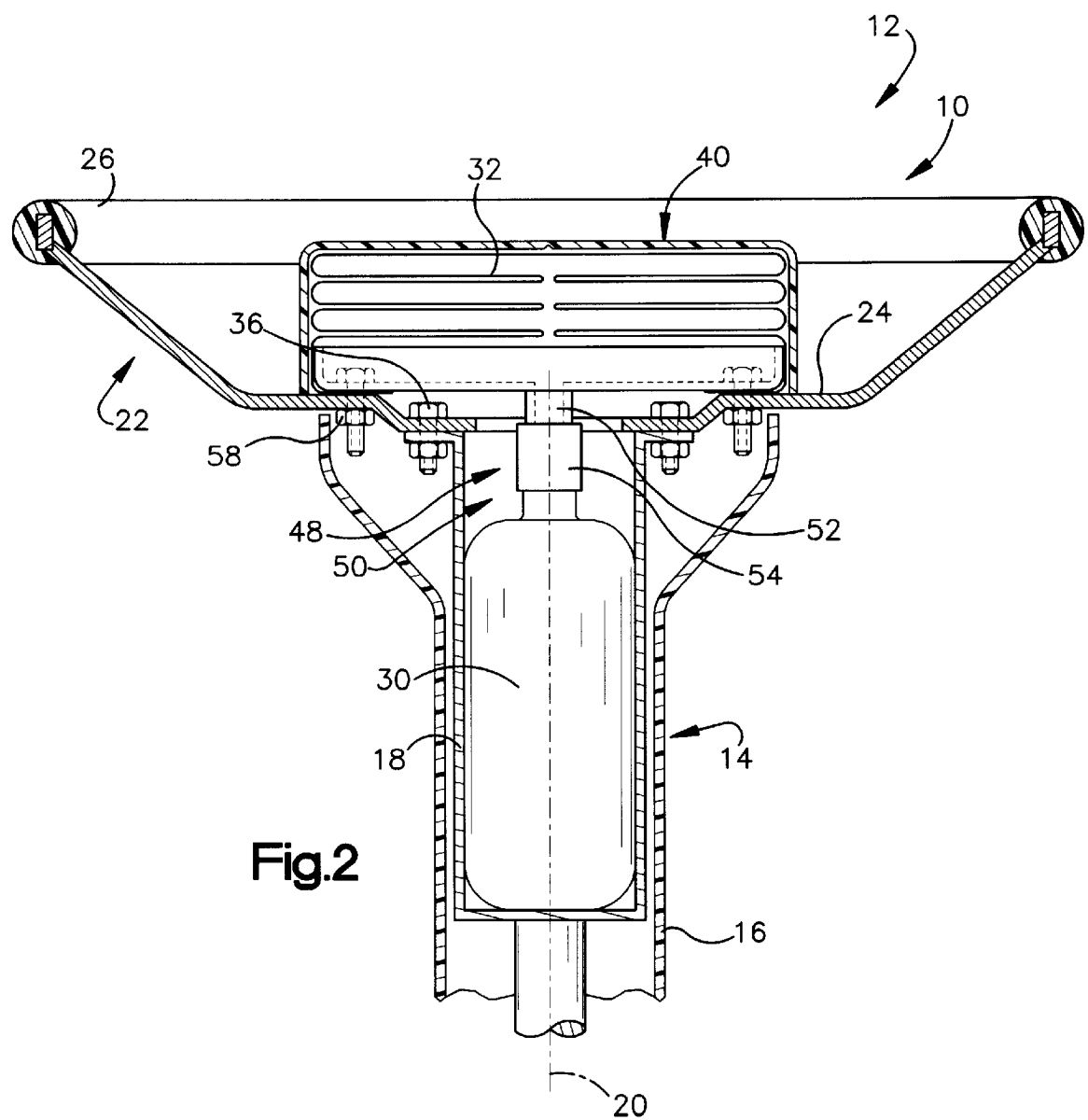
FIG. 2 is a view similar to FIG. 2 showing the air bag connected in fluid communication with the inflator.

The occupant protection apparatus 10 includes a conduit 48 (FIG. 2) connected in fluid communication between the inflator 30 and the air bag 32 for directing inflation fluid from the inflator 30 to the air bag 32. The conduit 48 includes at least one quick disconnect coupling 50 through which inflation fluid flows from the inflator 30 upon actuation of the inflator. The coupling 50 may be any suitable type of manually operable quick disconnect fluid coupling known in the art. For example, the coupling 50 may have the configuration shown in U.S. Pat. No. 3,351,362, issued Nov. 7, 1967, entitled "Quick-Disconnective Coupling". Other types of quick-disconnect couplings could be used, such as couplings that include a cam action or a rotating action.

The coupling 50 includes a plug 52 and a socket 54. The plug 52 is fixed to the retaining ring 34 and projects from the retaining ring in a direction away from the air bag 32. The plug 52 is hollow and is in fluid communication with the interior of the air bag 32.

The socket 54 is located on an outer end portion 56 of the inflator 30, so that inflation fluid from the inflator flows through the socket in response to actuation of the inflator. The socket 54 is engageable with the plug 52 to connect the inflator 30 in fluid communication with the air bag 32. An axially movable sleeve (not shown) on the socket 54 enables the plug 52 to be releasably interlocked with the socket.

To mount the air bag 32 on the steering wheel 22, the air bag assembly 44, including the plug 52, is moved along the axis 20 until the plug contacts and interlocks with the socket 54. The interlocking engagement of the plug 52 and the socket 54 couples the air bag 32 to the inflator 30. The interior of the air bag 32 is in fluid communication with the inflator 30. The air bag 32 is located remote from the inflator 30, with the conduit 48 between them.

Nuts 58 are screwed onto the fasteners 36 to secure the retaining ring 34 to the steering wheel 22. The air bag 32 is thus supported on the steering wheel 22 for rotation with the steering wheel about the axis 20. The air bag 32 is rotatable with the movable portion 18 of the steering column 14 as the steering wheel 22 rotates about the axis 20.

In the event of sensing of a vehicle condition for which protection of the vehicle driver is desired, the inflator 30 is actuated in a known manner. Inflation fluid is directed from the inflator 30 through the conduit 48 and the coupling 50 into the air bag 32. The fluid pressure inside the air bag 32 increases until the predetermined weakened portion 42 of the cover 40 ruptures. The cover 40 opens to enable the air bag 32 to inflate away from the steering wheel 22 into a position to help protect the vehicle driver.

The inclusion of the quick disconnect coupling 50 in the apparatus 10 enables the air bag 32 to be assembled to the steering column 14 separately from the inflator 30. Thus, the inflator 30 can be built into the steering column 14 at one point in the manufacture of the vehicle 12, and the air bag 32 at another point. In addition, the air bag 32 can be packaged in the vehicle 12 at a location even more remote from the inflator 30, with the air bag assembly 44 being movable as a whole relative to the inflator when the parts of the coupling 50 are not engaged. The separation of the air bag 32 from the inflator 30 provides significant flexibility in packaging of the apparatus 10 in the vehicle 12. For example, the air bag 32 and the inflator 30 can be releasably interconnected via a conduit 48 including additional tubing length (not shown) rather than with a plug 52 directly on the air bag and a socket 54 directly on the inflator. Also, the positions of the plug 52 and the socket 54 can be reversed, with the plug being located on the inflator 30 and the socket being located on the air bag 32.

Figure 3:
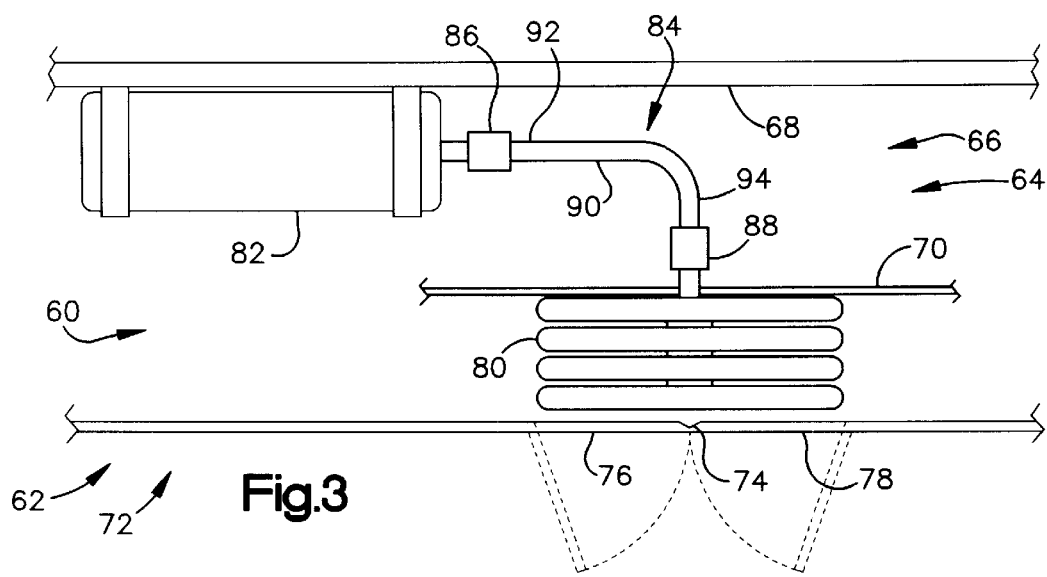
FIG. 3 is a schematic illustration of a vehicle occupant protection apparatus in accordance with a second embodiment of the invention, showing an air bag connected in fluid communication with an inflator in an instrument panel of a vehicle.

FIG. 3 illustrates a vehicle occupant protection apparatus 60 in accordance with a second embodiment of the invention. The occupant protection apparatus 60 is mounted in a vehicle 62, which includes an instrument panel 64. The instrument panel 64 has a fixed support portion 66, which, as shown schematically in FIG. 3, includes at least two parts 68 and 70. The instrument panel 64 also includes a trim pad or cover 72. The cover 72 has a predetermined weakened portion, or rupturable portion, 74 disposed between two movable portions 76 and 78 of the cover.

The occupant protection apparatus 60 includes an air bag 80 and an inflator 82. The inflator 82 is supported on the one part 69 of the fixed portion 66 of the instrument panel 64. The inflator 82 can be the same type of inflator as described above with reference to the first embodiment of the invention. The air bag 80 is supported on the other part 70 of the fixed portion 66 of the instrument panel 64, at a location remote from the inflator 82, behind the movable cover portions 76 and 78.

The occupant protection apparatus 60 includes a conduit 84 that connects the air bag 80 in fluid communication with the inflator 82. The conduit 84 includes two quick-disconnect couplings 86 and 88. Each of the couplings 86 and 88 can be of one of the types described above with reference to the first embodiment of the invention.

The conduit 84 also includes a length of tubing 90. A first end portion 92 of the tubing 90 is connected by the coupling 86 with the inflator 82. A second end portion 94 of the tubing 90 is connected by the coupling 88 with the air bag 80. The air bag 80, although located remote from the inflator 82, is thus connected in fluid communication with the inflator by the conduit 94 including the tubing 90 and the couplings 86 and 88. The tubing 90 is flexible to enable easy mounting and assembly of the apparatus 60 in the instrument panel 64 of the vehicle 62. The inflator 82 and the air bag 80 can be positioned almost anywhere relative to each other in the instrument panel 64 and still be easily and quickly connectable and disconnectable from each other.

Figure 4:
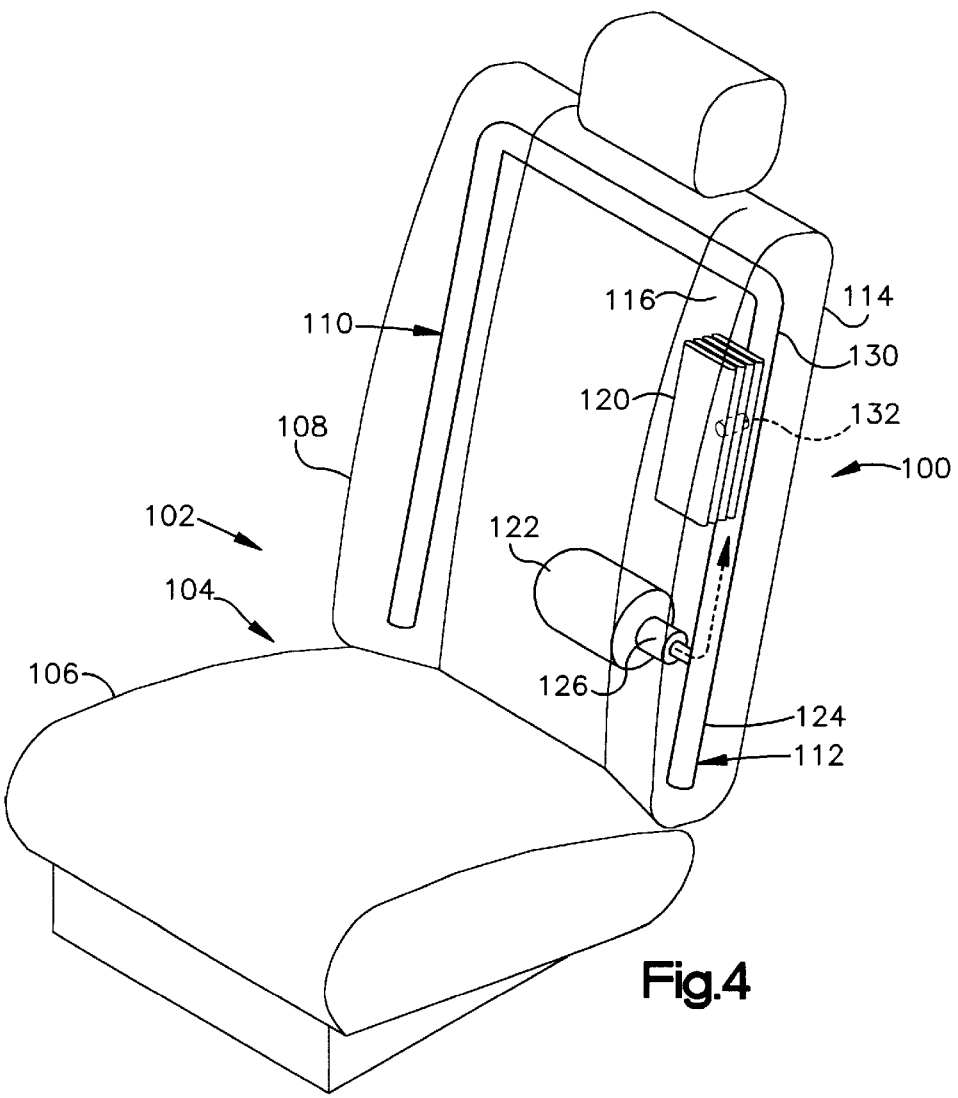
FIG. 4 is a schematic illustration of a vehicle occupant protection apparatus in accordance with a third embodiment of the invention, showing an air bag connected in fluid communication with an inflator in a seat of a vehicle.

FIG. 4 illustrates a vehicle occupant protection apparatus 100 in accordance with a third embodiment of the invention. The apparatus 100 is mounted in a vehicle 102, which includes a seat 104. The seat 104 includes a seat bottom cushion 106 and a seat back 108.

The seat back 108 includes a seat frame member 110 having a tubular construction. An outer side portion 112 of the seat frame member 110 extends generally vertically in the seat back 108, inside the outboard side bolster 114 of the seat 104. The side bolster 114 includes a fabric or leather covering material 116 having a predetermined weakened portion (not shown).

The apparatus 100 includes an air bag 120 and an inflator 122. A lower part 124 of the outer side portion 112 of the seat frame member 110 supports the inflator 122. The inflator 122 can be the same type of inflator as described above with reference to the first embodiment of the invention. A quick disconnect coupling 126 connects the inflator 122 in fluid communication with the interior of the tubular seat frame member 110.

The air bag 120 is supported on an upper part 130 of the outer side portion 112 of the seat frame member 110, remote from the inflator 122. A quick disconnect coupling 132 connects the air bag 120 in fluid communication with the interior of the tubular seat frame member 110. The coupling 132, as well as the coupling 126, can be of one of the types described above with reference to the first embodiment of the invention. The seat frame member 110, and the couplings 132 and 126, form a conduit that connects the air bag 120 in fluid communication with the inflator 122.

The use of the seat frame member 110 as an inflation fluid conduit, and the use of the quick-disconnect couplings 132 and 126, enable easy mounting and assembly of the air bag 120 and inflator 122 in the seat 104 of the vehicle 102. The inflator 122 and the air bag 120 can be positioned almost anywhere relative to each other in the seat 104 and still be easily and quickly connectable and disconnectable from each other.

FIGS. 5–7 illustrate a vehicle occupant protection apparatus 140 in accordance with a fourth embodiment of the invention. The apparatus 140 includes a side curtain indicated schematically at 142 and a fill tube 144 for directing inflation fluid into the side curtain.

The fill tube 144 has first, second and third relatively movable sections 146, 148 and 150. Each one of the fill tube sections 146, 148 and 150 has an elongate, tubular configuration with a plurality of inflation fluid outlets 152. The first section 146 has first and second opposite end portions 154 and 156. The second fill tube section 148 has first and second opposite end portions 158 and 160. The third fill tube section 150 has first and second opposite end portions 162 and 164.

The first end portion 154 of the first fill tube section 146 has a fitting 166 for receiving inflation fluid from an inflator (not shown). The fitting 166 is preferably, a portion of a quick disconnect coupling 168 of the type discussed above with reference to the first embodiment of the invention.

The three fill tube sections 146, 148 and 150 are shown in FIG. 5 arranged in an orientation parallel to and along side each other. This type of orientation is useful for shipping and storing of the fill tube 144 prior to assembly into a vehicle, because the fill tube as thus configured takes up minimal space.

To assemble the fill tube 144 into a vehicle, the second end portion 156 of the first section 146 of the fill tube 144 is connected with the first end portion 158 of the second section 148 by a quick disconnect coupling 170. A plug portion 172 of the coupling 170, located on the second end portion 156 of the first section 146 of the fill tube 144, is engageable with a socket portion 174 of the coupling 170 located on the first end portion 158 of the second section 148 of the fill tube. The engagement of the two parts of the coupling 170 connects the first fill tube section 146 in fluid communication with the second fill tube section 148. The first section 146 of the fill tube 144 and the coupling 170 form a conduit, connected in fluid communication between the inflator (not shown) and the second section 148 of the fill tube, through which inflation fluid flows from the inflator upon actuation of the inflator. The coupling 170 is covered by a flexible boot 176.

The second end portion 160 of the second section 148 of the fill tube 144 is connected with the first end portion 162 of the third section 150 by a quick disconnect coupling 180 similar to the coupling 170. The engagement of the two parts of the coupling 180 connects the third fill tube section 150 in fluid communication with the second fill tube section 148. As a result, all three sections 146, 148 and 150 of the fill tube 144 are connected in fluid communication. The second section 148 of the fill tube 144 and the second coupling 180 form a conduit, connected in fluid communication between the inflator and the third section 150 of the fill tube, through which inflation fluid flows from the inflator upon actuation of the inflator. The three fill tube sections 146, 148 and 150 can be assembled to the condition shown in FIG. 6 while the fill tube 144 is located within the side curtain 142.

From the above description of the invention, those skilled in the art will perceive improvements, changes and modifications in the invention. For example, a conduit could be used to connect an air bag and an inflator that are assembled together in a module using one or more quick-disconnect couplings on a housing or reaction canister or instrument panel. Such improvements, changes and modifications within the skill of the art are intended to be covered by the appended claims.

Having described the invention, we claim:

1. An apparatus for helping to protect an occupant of a vehicle, said apparatus comprising:
   an inflatable protection device supported for rotation about an axis, said protection device having a stored condition and being inflatable from the stored condition to a deployed condition for helping to protect the occupant;
   an actuatable inflator supported for rotation about said axis, said inflator being remote from said protection device for providing inflation fluid under pressure for inflating said protection device; and
   a conduit connected in fluid communication between said inflator and at least a portion of said protection device for directing inflation fluid from said inflator to said protection device, said conduit including at least one quick disconnect coupling through which inflation fluid flows from said inflator upon actuation of said inflator, said coupling being centered on said axis, said coupling having a first portion releasably interlocked with a second portion to connect said inflator in fluid communication with said protection device, said first portion being axially movable for enabling the releasably interlocked engagement of said first portion and said second portion.

2. An apparatus as set forth in claim 1 wherein said first portion of said coupling includes a plug and said second portion of said coupling includes a socket, one of said plug and socket being located on said inflator.

3. An apparatus as set forth in claim 1 wherein said first portion of said coupling includes a plug and said second portion of said coupling includes a socket, one of said plug and socket being located on said protection device.

4. An apparatus as set forth in claim 1 wherein said first portion of said coupling is connected with said inflator and said second portion of said coupling is connected with said protection device.

5. An apparatus as set forth in claim 1 wherein said inflator is located in a steering column portion of the vehicle, the vehicle including a steering wheel mounted on the steering column portion, said protection device being located on the steering wheel, said first portion of paid coupling being on said protection device and said second portion of said coupling being one of the steering column portion and said inflator, said first portion being engageable with said second portion to connect said protection device in fluid communication with said inflator.

6. An apparatus as set forth in claim 1 further comprising a cover for covering said protection device when said protection device is in the stored condition, said cover being movable in response to actuation of said inflator from a closed condition covering said protection device to an open condition to enable inflation of said protection device to the deployed condition.

7. An apparatus as set forth in claim 6 wherein said cover is a cover of an air bag module located on a vehicle steering wheel.

8. An apparatus for helping to protect an occupant of a vehicle, said apparatus comprising:
   an inflatable vehicle occupant protection device supported for rotation about an axis;
   an actuatable inflator supported for rotation about said axis, said inflator being remote from said protection device for providing inflation fluid under pressure for inflating said protection device;
   a conduit connected in fluid communication between said inflator and at least a portion of said protection device for directing inflation fluid from said inflator to said protection device, said conduit including a quick disconnect coupling through which said inflation fluid flows from said inflator upon actuation of said inflator, said coupling being centered on said axis, said coupling having a first portion releasably interlocked with a second portion to connect said inflator in fluid communication with said protection device, said first portion being axially movable for enabling the releasably interlocked engagement of said first portion and said second portion; and
   a cover for covering said protection device, said cover being movable in response to actuation of said inflator from a closed condition covering said protection device to an open condition to enable inflation of said protection device.

9. An apparatus as set forth in claim 8 wherein said protection device is inflatable from a stored condition to a deployed condition for helping to protect the occupant, said cover being in the closed condition and covering said protection device when in the stored condition.

* * * * *